United States Patent [19]

Gutzmer

[11] Patent Number: 5,134,649
[45] Date of Patent: Jul. 28, 1992

[54] ACOUSTIC COUPLER FOR HIGH-SPEED MODEM

[76] Inventor: Howard A. Gutzmer, 4335 Grace Rd., Bonita, Calif. 92002

[21] Appl. No.: 585,930

[22] Filed: Sep. 21, 1990

[51] Int. Cl.$^5$ .................. H04M 11/00; H04M 1/00
[52] U.S. Cl. ........................ 379/99; 379/443
[58] Field of Search ............... 379/443, 444, 99, 441

[56] References Cited

U.S. PATENT DOCUMENTS

| | | | |
|---|---|---|---|
| 2,831,923 | 4/1958 | Block | 379/443 |
| 4,252,996 | 2/1981 | D'Agostino | 379/443 |
| 4,288,661 | 9/1981 | Krishan | 379/443 |
| 4,415,769 | 11/1983 | Gray | 379/443 |
| 4,465,903 | 8/1984 | Barber | 379/443 |
| 4,926,464 | 5/1990 | Schley-May | 379/444 |

FOREIGN PATENT DOCUMENTS

| | | | |
|---|---|---|---|
| 3203129 | 8/1983 | Fed. Rep. of Germany | 379/443 |
| 58-3456 | 1/1983 | Japan | 379/99 |
| 2172773 | 9/1986 | United Kingdom | 379/99 |

Primary Examiner—James L. Dwyer
Assistant Examiner—Wing F. Chan
Attorney, Agent, or Firm—Brown, Martin, Haller & McClain

[57] ABSTRACT

A data coupler is disclosed for use in connecting a high speed data modem to a typical telephone handset in a high ambient acoustic noise field. The data coupler features a method for conserving, through a magnetic detection process, the high signal to noise ratio (HSNR) available at the telephone line during the acoustic coupling process. The use of magnetic detection prevents the deterioration of acoustic SNR normally expected in a high ambient acoustic noise field.

5 Claims, 2 Drawing Sheets

ACOUSTIC COUPLER FOR HIGH-SPEED MODEM

BACKGROUND OF THE INVENTION

1. Field of the Invention

The present invention generally involves telecommunication systems and more specifically involves telecommunications coupling devices.

2. Description of the Related Art

Modems are commonly used to permit a computer or facsimile machine to communicate with another like device over the telephone line. Conventional modems use a two-wire communications line that is typically connected directly to a two-wire telephone line.

In many telecommunications applications, it is not possible to use a dedicated telephone line for interconnection with a modem or facsimile machine. In telephone systems using a PBX arrangement, where many lines are served by a central controller, it is not always possible to obtain dedicated line service for data communications. In the PBX arrangement, reservation of dedicated telephone lines for data communications may result in under-utilization of the installed capacity.

With a conventional telephone set, the user may need to use a voice capable line for data communication purposes. The modem or facsimile machine may be coupled directly to such a telephone line if the necessary interconnection plug is available. In many situations, coupling of the modem or facsimile machine to the telephone line may be physically difficult, or impossible, without damaging the existing telephone set to telephone line interconnection. For example, many businesses and hotels have installed telephone sets that are hard-wired directly to a corresponding telephone line, having no modular plug and jack interconnection capability. Without the availability of modular jack interconnection to the telephone line, no available means exist for direct connection of the modem or facsimile machine to the telephone line.

In view of this difficulty, practitioners of the art have developed an acoustic coupling technique that is commonly used to couple data communications devices to the telephone line where no direct interconnection means are available. One such commonly used interface couples from the handset of a telephone to a device which translates sound signals emanating from the handset speaker into appropriate signals for use by the modem. This device also translates signals from the modem into an audio signal for detection by the handset microphone. The acoustic coupler device is used by dialing the phone number of a remote auto-answer modem whereupon the remote auto-answer circuitry connects to the telephone line and transmits a carrier signal. Upon hearing this carrier signal, the user places the handset into the acoustic coupling device. A microphone in the acoustic coupling device detects the sound of the carrier from the remote modem through the speaker in the handset. The acoustic coupling device then converts it into a signal which is interpreted by the local modem to mean that a connection has been made. The local modem completes the circuit with the remote modem by sending its own carrier through the acoustic coupling device, by way of the phone line, to the remote modem. Data communication between the two sites begins following this hand-shaking procedure. The reliability of this type of acoustic interface is poor for several reasons. The most significant problem with the acoustic coupling technique is the low signal-to-noise-ratio (SNR) resulting from the repeated conversion of the data signals from electronic form to audio form and back to electronic form again. Noise is introduced at each step of this conversion process, thereby reducing the SNR (signal-to-noise-ratio) of the data signals. These difficulties have for many years limited the application of this type of acoustic coupling device to data transmission rates of approximately 300 baud.

There is a strongly felt need in the community for a device which will permit coupling of modems and facsimile machines to a telephone line, where no direct coupling means are available, which will permit the high speed transmission of data. Such an interconnection capability is required for use with public telephones, car phones, multi-line PBX telephone sets, and hotel telephone sets having no direct interconnection means. The acoustic coupling device described above, known in the present art, is not suitable for these applications because of serious SNR degradation caused by intense levels of ambient noise in locations such as airports, roadside public telephones, automobile telephones during transit, and remotely located telephones facing poor transmission line SNR qualities. The modern transmission of data requires phase-shift modulation (PSM) and frequency-shift modulation (FSM) at data rates from 2,400 baud to 9,600 baud and above. These high-speed modulation-demodulation schemes require SNRs significantly above those available from existing acoustic coupling technology.

Practitioners of the electronic arts have demonstrated substantial interest in developing methods for interconnecting data transmission devices to the telephone lines. U.S. Pat. No. 4,367,374 issued to Arthur L. Serrano on Jan. 4, 1 983, discloses such a method that uses a circuit that directly couples a telephone handset to a modem with provision for monitoring data on the phone line. Serrano's invention requires that the telephone handset be plug-removable from the telephone base unit and is not a workable method for interconnecting at public telephones or mobile phones.

U.S. Pat. No. 4,446,335 issued to Charles E. Leeet al. on May 1, 1984, discloses an audio signal recording apparatus which permits the tapping of audio signals at the plugable interface between a telephone handset and a telephone base unit. Lee et al does not teach a method of interconnecting to telephone lines where telephone handsets are not plug removable from telephone base units. Similarly, U.S. Pat. No. 4,907,267 issued to Howard A. Gutzmer on Mar. 6, 1990, discloses an apparatus for inter-connecting a telecommunications device with the telephone system by way of the plug-removable telephone handset interface. Also, U.S. Pat. No. 4,160,122 issued to Sava W. Jacobson on Jul. 3, 1979, discloses a telephone earphone amplifier device which connects to the telephone base unit through the plug-removable handset interface.

The present invention successfully overcomes the difficulties caused by the SNR deterioration that occurs in acoustically noisy environments when coupling a data modem or facsimile machine to an acoustic telephone handset. The present invention is an unique apparatus for enabling high-speed data communications through a telephone set over a single telephone line where no direct electrical plug-removable interconnection means are available.

SUMMARY OF THE INVENTION

The present invention is a novel and improved device for connecting a data modem to a telephone line by way of the acoustic handset. The typical telephone set includes a handset containing a microphone and speaker mounted at opposite ends for use in voice communications by a person. The typical data modem uses a single two-wire communication line that is readily adaptable for direct coupling to the telephone line via a conventional RJ-11 modular plug. However, for the reasons discussed previously, direct access to the telephone line is often not available in hotels, at public pay phones, with cellular or portable phones, or with telephones found abroad that are installed to foreign specifications. The data modem user is obliged to use indirect means to connect the data modem to the telephone line under these circumstances. One method for such indirect connection involves the use of an acoustic coupling device which attaches to the acoustic telephone handset and converts the acoustic signal from the handset speaker into an electronic signal recognizable by the modem. Such a coupler also converts a modem output signal into an acoustic signal which is broadcast into the telephone handset microphone for transmission into the telephone line.

The present invention provides an acoustic coupling device for coupling a high-speed data modem to a standard telephone handset by overcoming the difficulties caused by inadequate signal-to-noise ratio (SNR) at the acoustic handset in high ambient acoustic noise environments such as those at public telephones in airports and on freeways. The present invention further provides for indirect acoustic coupling of high-speed data modems to pay telephones, which use carbon microphones, and to non-standard phones such as are found abroad. The present invention also provides a low SNR indirect coupling capability for standard data and telefax modems with no adjustment or improvement to the modem itself.

An illustrated embodiment of the present invention provides an acoustic coupler which can be held tightly against a standard telephone handset by means of a velcro strap and may be connected to a standard data modem by means of a length of wire terminated in the standard RJ-11 modular plug. This embodiment uses a magnetic detector to detect the signal at the telephone handset speaker. Because the telephone handset speaker signal is detected by magnetic means, the signal thus detected is free of all ambient acoustic noise. Because no ambient acoustic noise imposed on the telephone handset speaker signal, no SNR deterioration because of the conversion from acoustic to electronic form. This embodiment uses an acoustic speaker to transmit modem output signals into the telephone handset microphone. The acoustic output signal is switchable between a high level suited for the carbon microphones found in typical pay telephones and a lower level suited for the newer electronic microphones used in other modern telephones.

The present invention overcomes the problems seen in the typical acoustic coupler that picks up acoustic noise from the local environment and adds it to the acoustic signal received at the telephone handset speaker, thereby decreasing the available SNR at the modem input. This SNR reduction causes an increase in bit-error-rate (BER) for the frequency-shift modulation (FSM) used in the standard 1200 baud modem channel and the phase-shift modulation (PSM) used in the standard 1800 baud and 2400 baud high-speed modem channels. Phase-shift modulation permits the transmission of a 2400 baud signal within the limits of the typical telephone line channel, but the channel SNR must be maintained above a well-known minimum to obtain an acceptable bit-error-rate (BER).

The present invention avoids the degradation of channel BER by employing two distinct techniques to prevent channel SNR degradation. First, the use of magnetic detection at the telephone handset speaker avoids introducing local ambient acoustic noise into the data modem input channel. Second, the availability of enhanced acoustic output signal level from the present invention permits the data modem output signal level to be increased sufficiently to "shout down" any expected local ambient acoustic noise at the telephone handset microphone. This is especially important in connection with the standard pay telephone which uses a carbon microphone having about half of the sensitivity of the electronic microphones available in the modern telephone handset.

The present invention provides the standard 600 ohm impedance at the RJ-11 modular plug which permits the standard data modem to operate into the expected telephone line impedance. The present invention also provides transformer isolation at all ports. In summary, a device constructed according to the teachings of the present invention converts a typical telephone acoustic handset into a low BER telephone line connection suitable for high-speed data modem or facsimile modem applications. Accordingly, the present invention permits the coupling of any RJ-11 telephone plug-compatible device to any telephone line having an available telephone acoustic handset, which is the primary advantage of the present invention.

BRIEF DESCRIPTION OF THE DRAWINGS

These and other features, and advantages of the present invention will become more fully apparent from the detailed description set forth below in conjunction with the drawings in which like /reference characters identify corresponding references throughout and wherein.

DETAILED DESCRIPTION OF THE PREFERRED EMBODIMENT

Figure 1:
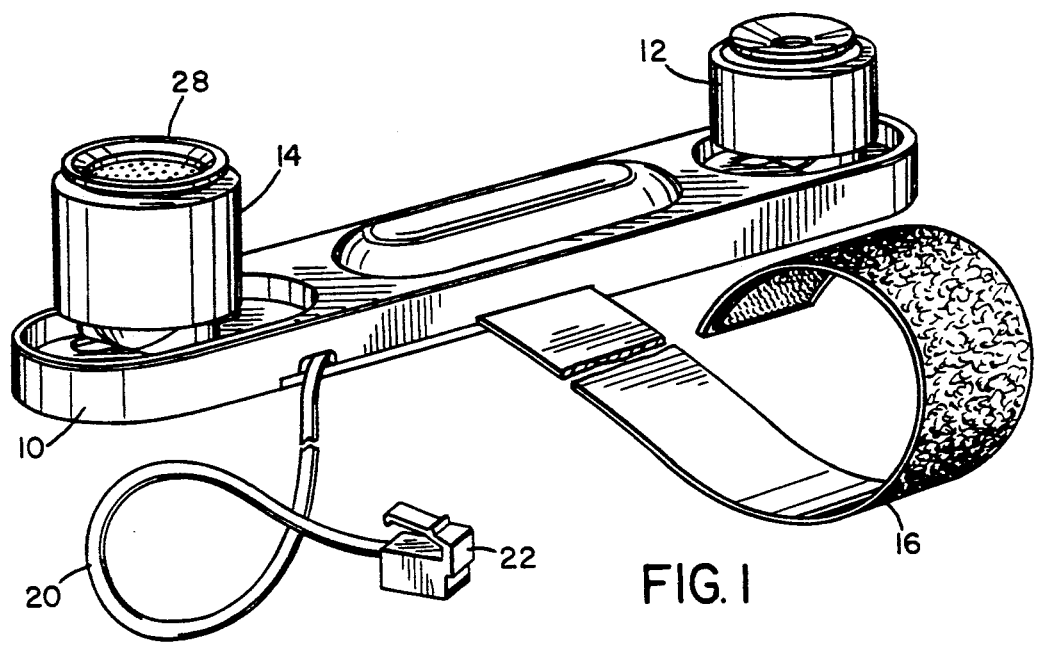
FIG. 1 is a perspective view of the acoustic coupler for high speed modem.
Figure 3:
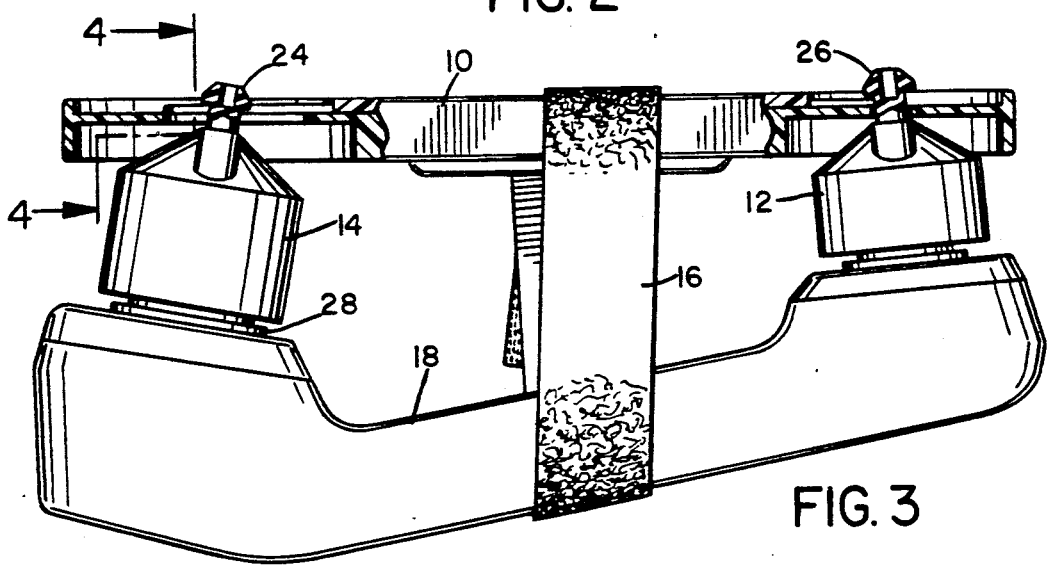
FIG. 3 is a sectional view taken on line 3—3 of FIG. 2, illustrating the coupler attached to a telephone handset.

Referring to FIG. 1, note that the illustrated embodiment of the present invention consists of a housing 10 with a magnetic signal detector 12 located at one end and an acoustic speaker 14 located at the other end. A velcro strap 16 having a preferred length of about 14 inches is attached to the middle of housing 10 and is adapted for use in gripping a telephone handset 18 as shown in FIG. 3. An electrical cable 20 and a standard RJ-11 modular plug 22 provide for connection to a standard data modem telephone line input plug (not shown). Cable 20 has a preferred length of about 36 inches.

Figure 2:
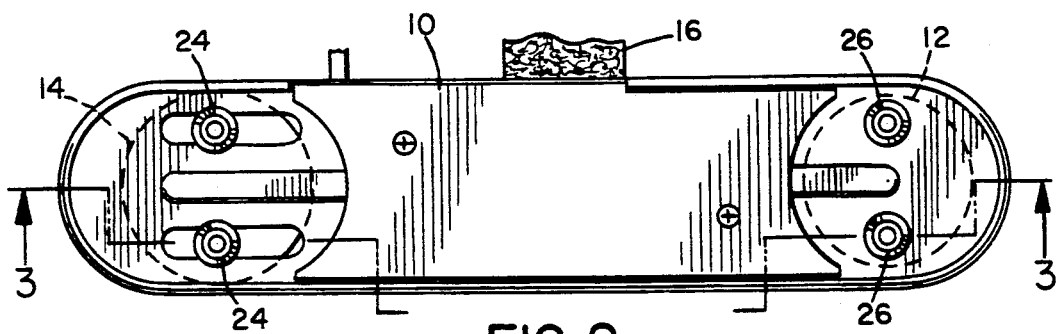
FIG. 2 is an underside view of the coupler of FIG. 1.

Speaker 14 and detector 12 are both housed within flexible rubber or plastic coverings adapted for fitting against the earpiece and mouthpiece of a standard telephone handset 18 as shown in FIG. 3. The flexible characteristic of the coverings allows speaker 14 and detector 12 to mold against the telephone handset, thereby forming a seal which minimizes the effect of ambient acoustic noise on the data signal. FIG. 2 shows speaker 14 to be slidably attached to housing 10 by two soft rubber stems 24. Detector 12 is similarly attached by soft rubber stems 26 without provision for moving slidably along housing 10, as shown in FIG. 2. Pliable stems 24 and 26 allow speaker 14 and detector 12 to tilt as necessary to conform to the angle of the mating surfaces of telephone handset 18 as illustrated in FIG. 3. The slidable attachment of speaker 14 allows it to be used with telephone handsets of various sizes.

Figure 4:
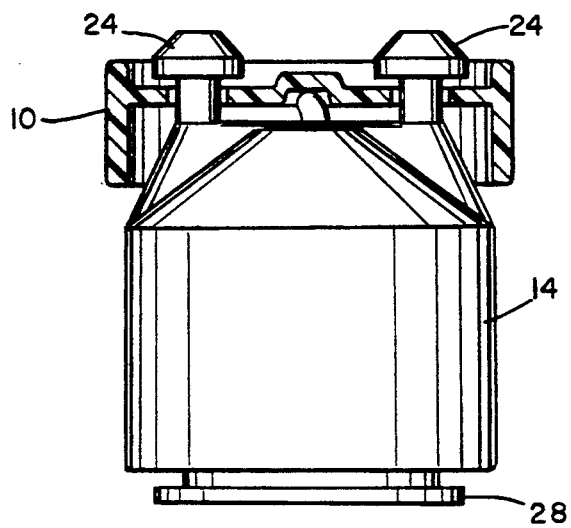
FIG. 4 is a sectional view taken on line 4—4 of FIG. 3.

Referring to FIG. 4, a sealing ridge 28 is sized to cover substantially all of the handset microphone area and thereby reduce the pickup of unwanted ambient acoustic noise by the telephone handset microphone. Ambient noise rejection need not be perfect because the signal available at speaker 14 is sufficiently robust to overcome any ambient noise which is not rejected by the seal between lip 28 and telephone handset 18. Because such a robust signal is not available at the earpiece of the telephone handset, the acoustic signal-to-noise ratio (SNR) expected at detector 12 in FIG. 3 is inadequate for high-speed phase-shift modulation (PSM) data transmission. This is especially true in high ambient acoustic noise environments such as airport pay phones and telephones near major highways and freeways. Accordingly, the present invention provides magnetic signal detector 12 which serves to detect the magnetic field generated by the handset speaker magnet (not shown) in response to the incoming signal from the telephone line. This magnetic signal is exactly equivalent to the acoustic signal at the earpiece of the telephone handset except that magnetic signal detector 12 is insensitive to ambient acoustic noise. This insensitivity allows the incoming signal to be detected by magnetic signal detector 12 with no SNR degradation through local acoustic noise.

Figure 5:
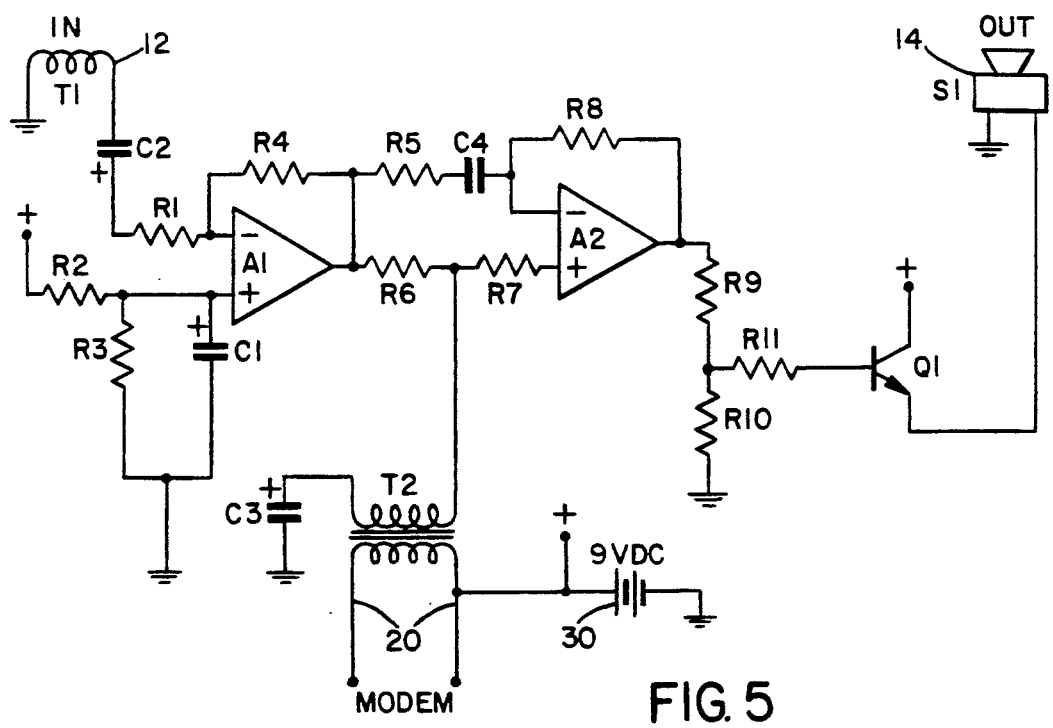
FIG. 5 is a schematic circuit diagram of the acoustic coupler.

In FIG. 5, operational amplifier A1 is biased by resistors R4 and R1 to provide a gain of about 100 to the AC signal detected at magnetic sensor transformer T1. The capacitor C2 serves to block DC bias current flow which would otherwise occur through transformer T1. The resisters R2 and R3 bias operational amplifier A1 by providing about 5 volts DC at the positive input. Blocking capacitor C1 serves to block DC current while allowing AC voltages present at the positive input to operational amplifier A1 to flow to ground. The AC signal at the output of amplifier A1 is imposed on a DC voltage level of about 5 volts, which is approximately half of the DC supply voltage provided by battery 30. The resistor R6 is selected to be approximately the same as the line impedance presented by transformer T2 which is 600 ohms. This puts about half of the AC output from amplifier A1 across transformer T2, which is a one-to-one transformer. The AC signal flows through the primary of transformer T2 and thereafter through capacitor C3 to ground. The purpose of capacitor C3 is to allow AC current to pass to ground while blocking the DC bias voltages necessary for proper operation of amplifiers A1 and A2.

Amplifier A2 is biased by means of resistors R5 and R8 and capacitor C4 to provide an AC gain of unity. The AC voltage signal at transformer T2 is reproduced at the output of operational amplifier A2. The resistors R9 and R10 form a voltage divider which steps down the AC voltage at the output of amplifier A2. This stepped-down voltage is then input to the base of an emitter-follower formed by resistor R11 and transistor Q1. This emitter-follower provides an isolated current source which drives speaker S1 at the desired amplitude. The purpose of switch SW1 is to boost the voltage input to transistor Q1 and thereby the current output from Q1 through speaker S1 to provide the higher amplitude necessary for pay telephones having carbon microphones.

A feature of the present invention is the conservation, through the acoustic and magnetic conversion process, of the SNR available at the telephone line. Referring to FIG. 5, the magnetic signal detector 12 is T1 in the diagram, and acoustic signal speaker 14 is S1 in the diagram. Modem cable 20 is shown connected to the secondary winding of transformer T2. The circuit shown in FIG. 5 converts a signal at detector 12 into a signal at modem cable 20 with the standard 600 ohm impedance and line voltage levels necessary for proper modem function. The circuit also converts the signal at modem cable 20 into an acoustic signal at acoustic speaker 14 having sufficient amplitude to give the necessary SNR at the telephone line for low BER transmission to a remote receiver.

It is an important feature of the present invention that a two-wire modem circuit can be indirectly connected to a four-wire telephone line. In that sense, the illustrated embodiment serves as a four-wire to two-wire converter. The purpose of the signal at the negative gain terminal of operational amplifier A2 is to eliminate any AC gain for amplifier A2 thereby insuring unity gain at all of the AC frequencies of interest.

Another useful feature of the illustrated embodiment is shown at modem cable 20, which is connected to the positive batter supply. Transformer T2 fully isolates the positive voltage imposed on cable 20 from the remainder of the circuit. The illustrated arrangement allows the modem (not shown) to take power from cable 20 as will normally be possible when the modem is connected directly to a standard telephone line.

The previous description of the preferred embodiment is provided to enable any persons skilled in the art to make or use the present invention. Various modifications to this embodiment will be readily apparent to those skilled in the electronic arts and the generic principals defined herein may be applied to other embodiments without the use of the inventive faculty. Thus, the present invention is not intended to be limited to the embodiment shown herein, but is to be accorded the widest scope consistent with the principals and novel features disclosed herein and is limited only in accordance with the following claims:

I claim:

1. A data coupler for connecting a high speed data modem to a typical telephone handset in a high ambient acoustic noise field, said handset having an earphone portion and a microphone portion, comprising;

magnetic transduction means for receiving a first audio frequency signal at said earphone portion of said telephone handset;

first amplifier means for amplifying said received first audio frequency signal;

transformer means for transmitting said amplified first signal to said high speed data modem and for receiving a second audio frequency signal from said modem;

second amplifier means for amplifying said received second audio frequency signal;

third amplifier means for amplifying said once amplified second audio frequency signal;

gain switching means for changing the gain of said third amplifier means; and acoustic transduction means for transmitting said twice amplified second audio frequency signal to said microphone portion of said telephone handset.

2. The coupler of claim 1 wherein said first and second amplifier means each comprise an operational amplifier.

3. The coupler of claim 2 wherein said third amplifier means comprises an emitter follower.

4. The coupler of claim 3 wherein said magnetic transduction means comprises an inductive coil.

5. The coupler of claim 3 wherein said acoustic transduction means comprises an electromechanical speaker.

* * * * *